No. 616,572. Patented Dec. 27, 1898.
W. HERRICK.
CEMENT INJECTOR FOR REPAIRING PNEUMATIC TIRES.
(Application filed Oct. 12, 1898.)
(No Model.)
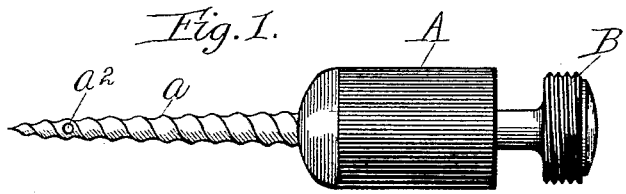
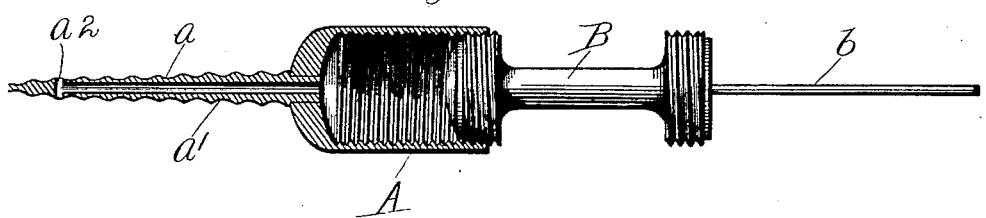
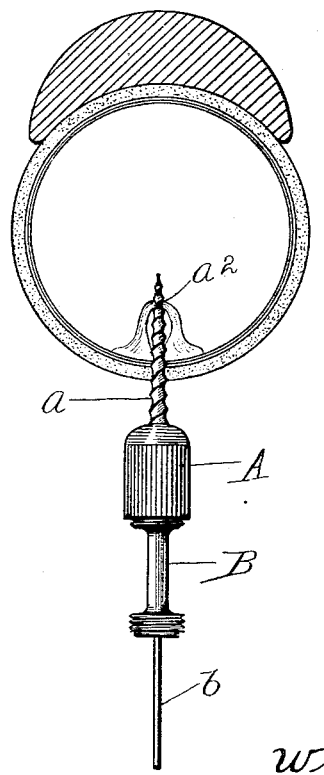

UNITED STATES PATENT OFFICE.

WILLIAM HERRICK, OF CHICAGO, ILLINOIS, ASSIGNOR TO THE MORGAN & WRIGHT, OF SAME PLACE.

CEMENT-INJECTOR FOR REPAIRING PNEUMATIC TIRES.

SPECIFICATION forming part of Letters Patent No. 616,572, dated December 27, 1898.

Application filed October 12, 1898. Serial No. 693,332. (No model.)

*To all whom it may concern:*

Be it known that I, WILLIAM HERRICK, a citizen of the United States, residing at Chicago, in the county of Cook and State of Illinois, have invented a certain new and useful Improvement in Cement-Injectors for Repairing Pneumatic Tires, of which the following is a specification.

My invention relates to injectors for introducing a suitable quantity of cement within a punctured pneumatic tire for purposes of repair, and has for its object the provision of a simple, compact, and easily-operated injector for use in repairing pneumatic tires of all classes, but more particularly adapted for use in repairing tires of the single-tube or hose-pipe class.

Previous to my invention, it has been customary to repair punctures in single-tube tires either by enlarging the puncture and inserting a rubber plug therein or by injecting within the tire a quantity of cement sufficient to fill the puncture and form a sort of button on the inner surface of the tire, the cement-injector employed in the latter method being held with the nozzle pointing upward when in use, so as to permit the cement to flow down the outside of the nozzle and collect about the puncture, through which the nozzle extends. The first method is objectionable, for the reason that in order to effectively close a puncture by means of a rubber plug it is necessary to first enlarge the puncture, or, more properly speaking, to punch or cut out the punctured portion, and in so doing a number of the threads incorporated within the tread of the tire are necessarily broken or severed. The second method, while not ordinarily open to the objection just stated, has never been extensively adopted, for the reason that up to the date of my invention no form of cement-injector had been proposed which would insure an even and accurate distribution of the cement in and about the puncture. The form of injector employed for such purposes has usually consisted of a cup or holder provided with a suitable nozzle, the cup or holder being adapted to contain the cement, and a plunger being provided for forcing the cement out of the cup or holder by way of the nozzle. The said nozzle has generally been made externally smooth and provided with a straight bore, terminating at the end of the nozzle in a single opening. An injector thus constructed is inefficient, for the reason that the cement will invariably flow down but one side of the nozzle, and the operator then withdrawing the injector by a straight pull leaves the larger portion of the cement at one side of the puncture and so fails to make an effective repair. For the purpose, therefore, of overcoming the foregoing objections and difficulties I provide a cement-injector having a tapered and externally-threaded nozzle, the bore of which latter terminates a short distance from the outer end of the nozzle in a couple of opposite and lateral discharge-openings. The nozzle thus tapered and externally threaded may be screwed into the puncture without severing or breaking the threads, the latter being simply pushed or crowded to one side, and the cement, which is of a semiliquid nature, will, when forced from the two lateral discharge-openings, flow and hang down each side of the nozzle in substantially equal volumes. In this way the cement is deposited at opposite sides of the puncture and also of the nozzle, the latter being still within the tire, and as the nozzle can only be withdrawn by unscrewing the cement will thereby be twisted and formed into a mass or button directly over the inner end of the puncture. The unscrewing of the nozzle from the puncture also serves to draw into the latter a small quantity of cement and in such way to further insure an effective repair. Thus constructed it will be seen that my improved form of injector permits the introduction of a suitable quantity of cement without injuring the fabric of the tire, that the provision of a couple of lateral discharge-openings permits the cement to be deposited at each side of the puncture, and, further, that the threading of the nozzle compels the operator to manipulate and withdraw the injector in a way that insures a perfect repair.

In the accompanying drawings, Figure 1 represents in side elevation a cement-injector embodying my invention. Fig. 2 is a longitudinal section of the same, showing the plunger reversed and in position to force cement from the nozzle. Fig. 3 is a view illustrating the method of repairing a punctured pneumatic tire with my improved form of injector.

The cement-injector illustrated comprises a cement cup or holder A and a plunger B. The cement-cup A is provided with a nozzle $a$, and the plunger B, which is reduced at its middle portion, has its end portions screw-threaded with reference to the threaded bore of the said cement-cup. The nozzle $a$ is externally screw-threaded and preferably tapered, so as to provide a point. The longitudinal bore $a'$ of the said nozzle extends from the chamber of the cup A to the transversely-bored opening $a^2$. The exterior of the cup A is preferably milled or otherwise roughened, and the plunger B is provided at one end with a short wire or stem $b$.

The manner in which my invention is employed in repairing a punctured tire consists in first filling the cup A with the semiliquid cement and then partially screwing the plunger into the bore of the cup, as shown in Fig. 2. The nozzle of the injector is then screwed into the puncture, as shown in Fig. 3, and the plunger screwed farther into the bore of the cup, so as to drive or force the cement through the bore of the nozzle and out through the two lateral discharge-openings formed by the transverse opening $a^2$. When thus driven or forced from the nozzle, the cement will flow and hang down each side of the nozzle, as illustrated by Fig. 3, and by then turning the injector so as to partially unscrew the nozzle from the puncture the two portions of cement will be twisted and forced to flow together. In this way a mass of cement or button will be formed around the puncture and also around the nozzle, the end of the latter being still within the tire, and by then totally unscrewing the nozzle from the puncture a small portion of the cement will be drawn directly into the puncture. Thus it will be seen that by providing a threaded nozzle having a couple of opposite and lateral discharge-openings not only all liability of the cement being deposited entirely to one side of the puncture is avoided, but also that the operator is compelled to withdraw the nozzle in a way that insures an even distribution of the cement in and about the puncture, and finally that such repair is effected without in any way injuring the fabric of the tire.

The wire or stem $b$ is designed to afford means for cleaning out the bore $a'$ and also the opening $a^2$ should at any time the said passages become clogged with dried cement. When not in use, the plunger is screwed into the cup or holder, as shown in Fig. 1, so as to permit the wire or stem $b$ to extend through the bore of the nozzle, and in this condition the injector may be conveniently carried in the pocket or tool-bag.

While I do not limit myself to any particular form of plunger and cement-cup, I prefer the construction described and illustrated, for the reason that such form is simple and compact, and permits a definite amount of cement to be injected into the tire, as the cup or holder A is adapted to hold cement sufficient to make but one repair.

What I claim as my invention is—

A cement-injector for use in repairing pneumatic tires, comprising a suitable cup or holder for containing the cement, and a plunger or similar device for ejecting the cement therefrom; the said cup or holder being provided with a tapered or pointed discharge-nozzle having a longitudinal bore which terminates in two or more lateral discharge-openings whereby the nozzle may be readily inserted through a puncture and the cement deposited at each side thereof; and the said discharge-nozzle being externally threaded, whereby the operator will be compelled to manipulate the injector in a way that will insure an effective repair.

WILLIAM HERRICK.

Witnesses:
ARTHUR F. DURAND,
CHAS. G. PAGE.